(12) United States Patent
Cox (10) Patent No.: US 8,447,757 B1
(45) Date of Patent: May 21, 2013

(54) LATENCY REDUCTION TECHNIQUES FOR PARTITIONED PROCESSING

(75) Inventor: Richard S. K. Cox, San Francisco, CA (US)

(73) Assignee: A9.com, Inc., Palo Alto, CA (US)

( * ) Notice: Subject to any disclaimer, the term of this patent is extended or adjusted under 35 U.S.C. 154(b) by 296 days.

(21) Appl. No.: 12/549,228

(22) Filed: Aug. 27, 2009

(51) Int. Cl.
*G06F 15/16* (2006.01)
*G06F 17/20* (2006.01)

(52) U.S. Cl.
USPC ............................................ 707/720; 707/721

(58) Field of Classification Search
USPC .......................................... 707/713, 720, 721
See application file for complete search history.

(56) References Cited

U.S. PATENT DOCUMENTS

| | | | |
|---|---|---|---|
| 2003/0229804 A1* | 12/2003 | Srivastava et al. ............ | 713/200 |
| 2005/0065921 A1* | 3/2005 | Hrle et al. ........................ | 707/3 |
| 2005/0131893 A1* | 6/2005 | Von Glan ........................... | 707/5 |
| 2008/0313189 A1* | 12/2008 | Mehta et al. ..................... | 707/10 |
| 2009/0043745 A1* | 2/2009 | Barsness et al. .................. | 707/4 |
| 2009/0248631 A1* | 10/2009 | Alba et al. ......................... | 707/3 |

OTHER PUBLICATIONS

Lima et al; Adaptive Virtual Partitioning for OLAP Query Processing in a Database Cluster; Published 2004; pp. 1-14.*

* cited by examiner

*Primary Examiner* — Alex Gofman (74) *Attorney, Agent, or Firm* — Novak Druce Connolly Bove + Quigg LLP (57) ABSTRACT

Overall latency is reduced when processing tasks such as search queries by determining which tasks are "expensive," or likely to exceed desired latency thresholds. For expensive queries processed according to partitions, the segments for each partition can be divided among various sub-queries, which allow each partition to be processed in parallel by multiple devices without the need for repartitioning. Further, the responses to the sub-queries can be monitored, and if one or more responses are not received within a specified amount of time then each sub-query for which a response is missing can be resent. The first response received will be consolidated with the results from the other queries, and the result returned.

19 Claims, 5 Drawing Sheets

FIG. 5

LATENCY REDUCTION TECHNIQUES FOR PARTITIONED PROCESSING

BACKGROUND

As the number of users viewing information and performing tasks electronically increases, there is a corresponding increase in the amount of resources needed to serve these users. Simply adding additional machines or capacity is not always a desirable approach, however, as the additional capacity can be expensive to obtain, operate, and maintain. Further, systems often need to be taken offline or otherwise made unavailable for at least a short period of time in order to add the additional capacity. For example, when a user submits a query to a search engine, that query can be handled by any of a number of servers. If a sufficiently large index is being searched, the query itself may be processed in parallel by multiple servers.

Even when multiple servers are being used, however, there can still be problems such as undesirable latency and processing failure. For example, some tasks require much more processing capacity that other tasks. Simply adding more machines to provide maximum capacity is not optimal, however, as the system will generally provide more processing capacity than is needed, and thus will often waste resources. Further, adding machines to scale capacity typically requires the system to be made unavailable for a period of time, which can be undesirable for content providers such as providers of an electronic marketplace where any outage or unavailability can result in a significant loss of revenue and decrease in customer satisfaction.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to processing tasks in an electronic environment. In many embodiments, a request such as a search query can be processed by multiple servers or other such devices, each handling a partition or other such portion of the work for the task. In various embodiments an index can be used which includes multiple segments, each segment corresponding to a partition of the system. When a query or other task is received, a determination can be made as to whether the query is an "expensive" query, or a query that may take more than a desired amount of time to be executed against the index using the standard number of partitions. If a query is determined to be expensive, a number of sub-queries can be generated for each partition that each include a sub-range of the segments corresponding to that partition. Each of these sub-queries can be sent to a different location, such as a different partition server. In this way, the number of devices processing portions of the query can be increased without increasing the number of dedicated partition servers or otherwise scaling the effective "width" of the system. Such an approach can improve latency for expensive queries while handling typical queries using standard processing approaches. Further, there is no need to take down the system to repartition or perform other such tasks, as the additional servers used to handle sub-queries for an existing partition can be added and removed automatically.

Latency can further be improved by providing for adaptive retries of queries and sub-queries. In a case where a query is being processed in parallel by multiple servers, for example, it is possible that a problem will arise that will cause at least one of those servers not to provide a response within a desired amount of time. Systems and methods in accordance with various embodiments can wait for a minimum number or percentage of servers to respond, for example, and then can trigger a retry timer or other such mechanism for monitoring a response time for the remaining servers. If all the responses are not received within a specified amount of time, each sub-query for which a response is missing can be resent, such as to a different device. When a response is received for a remaining sub-query, the results can be consolidated with the results for the other sub-queries, regardless of whether the results are from the originally-sent or resent sub-query. In some embodiments, the sub-queries can be resent until results for all sub-queries are received, or until an end criterion is met. Various other approaches can be used as are discussed and suggested herein, and would be apparent to one of ordinary skill in the art in light of the teachings and suggestions contained herein.

Figure 1:
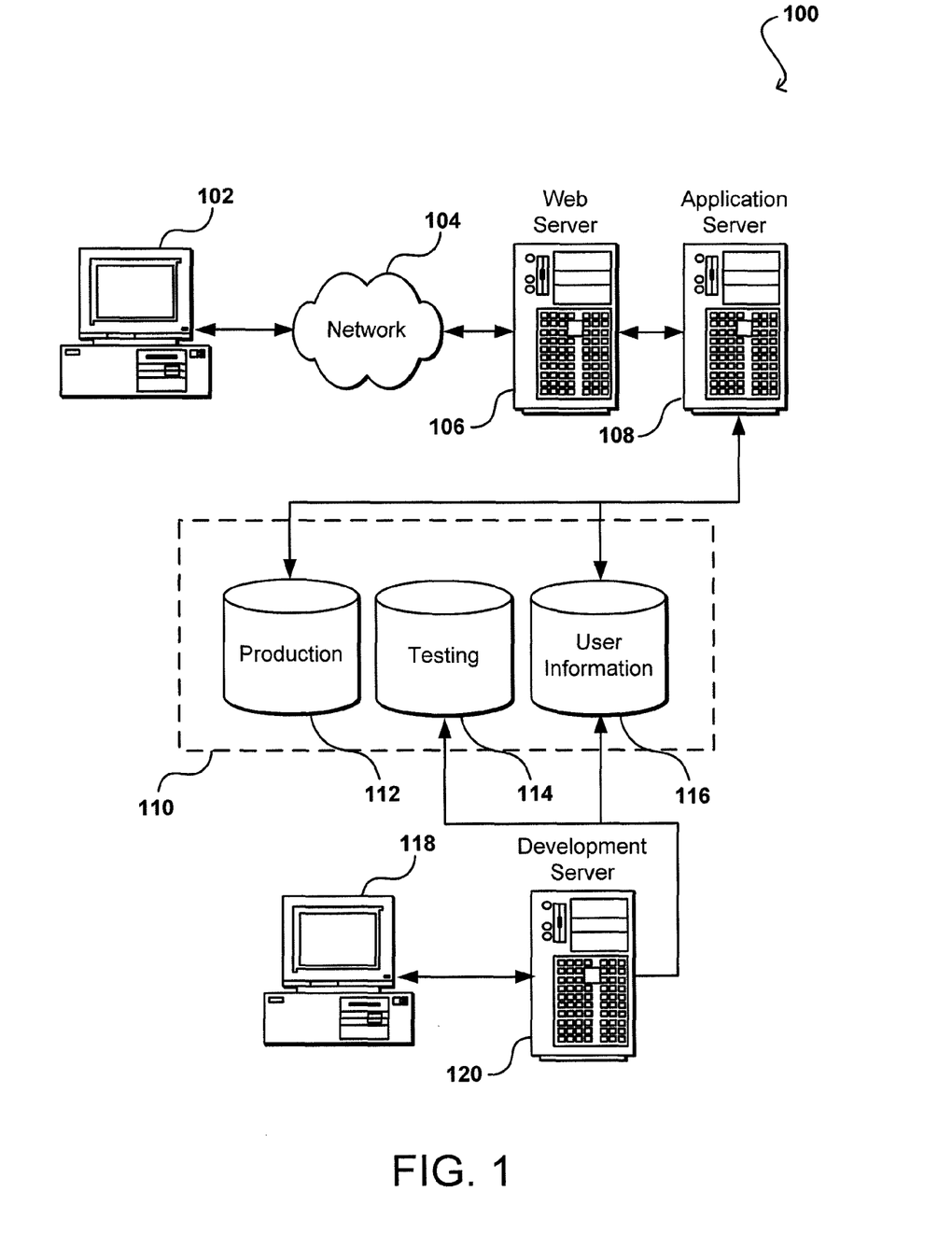
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a content provider or publisher, such as an electronic retailer or a provider of an electronic marketplace, wherein users may wish to search for items or content offered by the provider of the marketplace. The electronic environment in such a case might include additional components and/or other arrangements, such as those illustrated in the configuration 200 of FIG. 2. It should be understood, however, that components of FIG. 2 can be used independently or as portions of other such systems or environments.

Figure 2:
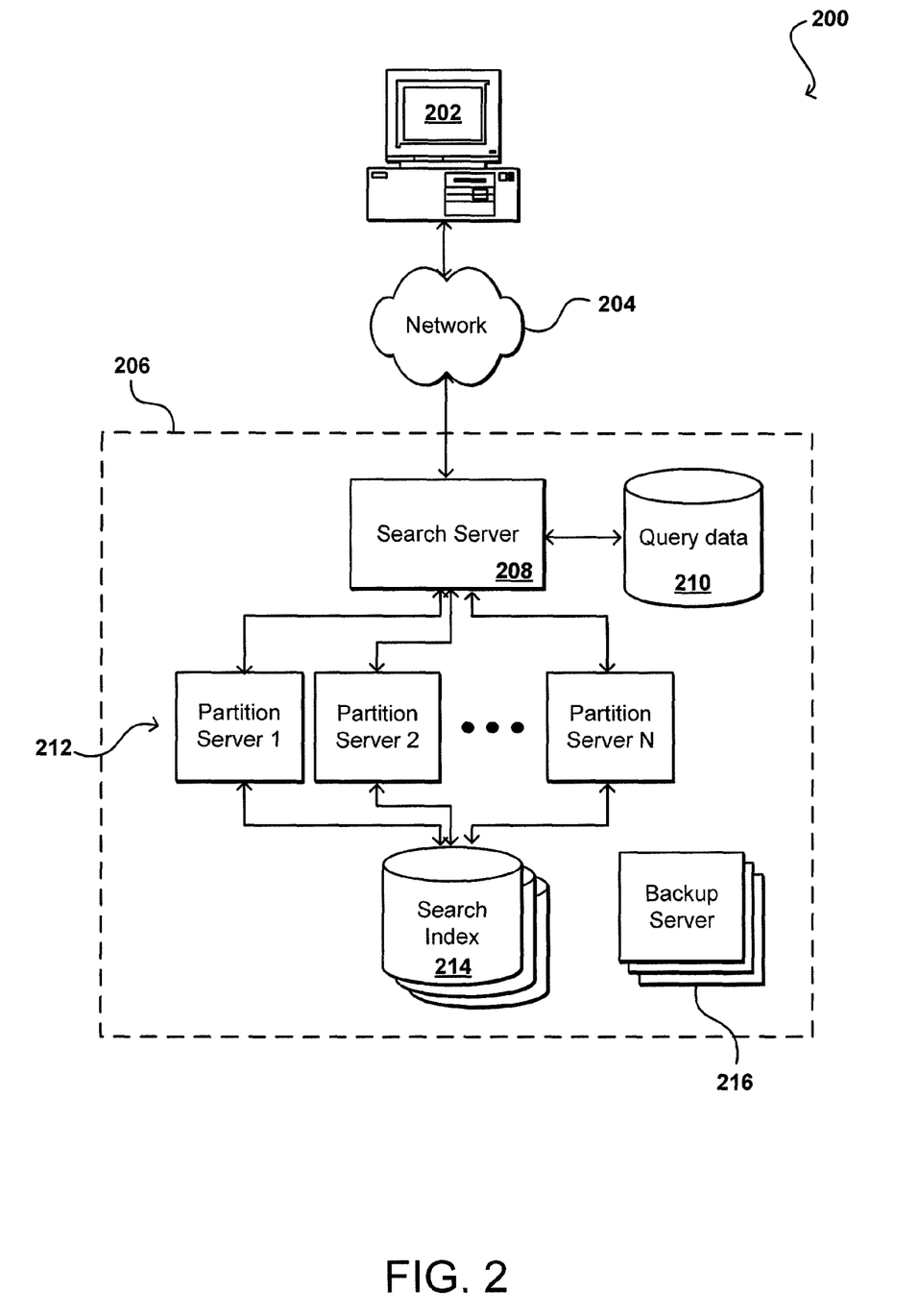
FIG. 2 illustrates components for providing search results that can be used in accordance with one embodiment.

In this example, a user of a client device 202 is able to submit requests, such as search requests including a query or at least one keyword, to a search system 206 across a network 204. As discussed elsewhere herein, the network 204 can be any appropriate network, such as the Internet or an extranet. The request can be received to at least one processing component, such as a search server 208. As should be apparent, the request could first be received to a Web server in an Internet-based context, or to any appropriate router or other such device in accordance with various embodiments. Various other or alternative components for sending and receiving requests can be used as well in the various embodiments.

When the request is received, the search server 208 can analyze the request and can consult a data store such as a query data store to determine aspects about the request useful in determining how to process the request. For example, the search server can attempt to determine a category or type of request, and can consult historical data to attempt to determine an amount or type of resources to be used to process the request. In one embodiment, a request can be classified by type or category, which can determine the number of machines or partitions to be used to process the request. For example, if the user request is determined to relate to an "apparel" category, the search server can consult the data store 210 to determine that twelve partitions are to be used to process the user request. The search server 208, or another such component, can divide the work for the user request across the specified number of partitions, and send a partition-specific request for each partition. In this example, it can be seen that there are several servers 212 that each receive one of the partition-specific requests. In the example where the user request corresponds to a search query, the query can be executed against a search index 214, or multiple instances of the search index, with each of the partition-specific queries processing a range of indices or segments of the search index. For example, if the search index has M segments, and there are N partitions, then each machine processing a partition executes the search query against M/N segments. A first server for a first partition could process segments:

1 ... (M/N), a second server for a second partition could process segments:

(M/N+1) ... (2*M/N), and an Mth server for an Mth partition could process segments:

([(N−1)*(M/N)]+1) ... M.

The system can also include one or more backup servers 216, such that if a partition-specific request is sent to a specified server, but that server is not able to process the request or is otherwise not available, the partition-specific request can be sent to a backup or secondary server. Although shown as a pool of separate backup servers, it should be understood that there can be many variations in accordance with other embodiments, such as multiple instances for each partition server, backup servers for multiple specific partitions, dedicated backup devices, redundant servers, or any other such configuration. In some cases there can be a fleet of servers or other such devices, and a load distribution or other such component can select a server from the fleet to process each partition of work. If a selected server is not available, the load distribution component can send the partition-specific request to another server in the fleet. Various other approaches for distributing work across a number of devices can be used as well within the scope of the various embodiments.

As discussed, a potential problem with such an approach is that there typically is a fixed number of partitions to process any given request. If the request requires a significant amount of processing capacity, however, the latency or time needed to process the request can be more than is desired. In certain cases, a time-out or other such value or criterion can be reached before the request is processed. For example, a user might submit a very broad search query such as "paperback" to a content provider that indexes books. In such a case, even if the amount of work is divided among ten partitions, the amount of work per partition can be such that the request cannot be processed before a time-out value (or other such terminating time or occurrence) is reached for the request.

Figure 3A:
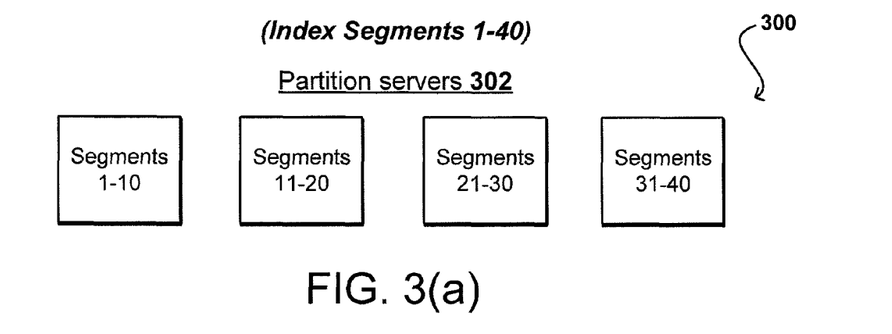
FIGS. 3(a)-3(c) illustrate examples of partition server configurations that can be used to process a task in accordance with various embodiments.
Figure 3B:
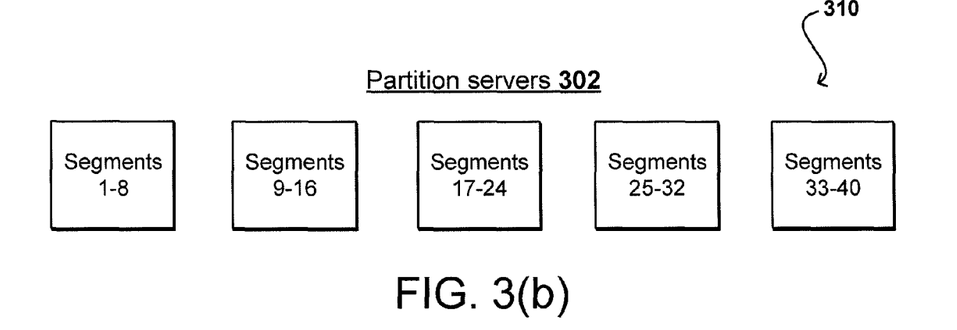
Figure 3C:
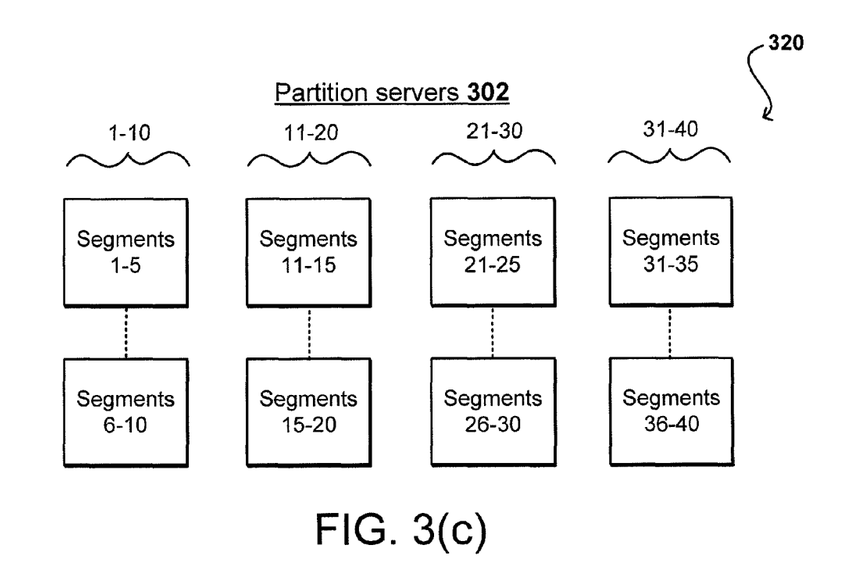

FIGS. 3(a)-3(c) illustrate example ways of partitioning processing devices in order to process a request. In these examples, an index is searched which includes forty segments. Any of a number of possible constraints can be used to build or otherwise configure an index to include a desired number of segments. In this example, there are forty segments, although any appropriate number can be used, and an appropriate number of "sub-queries" or additional queries can be generated that each corresponds to a subset or range of those segments. In this example the index starts at a segment value of '1', although it should be understood that the segments could start at '0' or any other appropriate value. As discussed above, a set of partitions can be established to process a request against the index. In the example 300 of FIG. 3(a), there are four partitions designated to process the request, with each partition being handled by what will be referred to herein as a "partition server" 302, or a processing device selected to handle a partition of work. As can be seen, the segments of the index can be spread relatively evenly across the partition servers, although in some embodiments where segments have different relative sizes, the work could be distributed using any other appropriate approach.

As discussed, however, such an approach may not be optimal if a request is received that is unable to be processed using only four partitions for a given system within a specified amount of time, such as before a timeout threshold is reached. An approach that can be used in accordance with various embodiments reduces the amount of work that each server has to process by spreading the work to additional servers. For example, FIG. 3(b) illustrates an example configuration 310 wherein a fifth server is added, with respect to the configuration of FIG. 3(a), such that the work can be distributed among five servers instead of four. As can be seen, each server now can process ⅕ of the segments, or eight segments instead of ten segments. For a search engine embodiment, for example, the search process can be thought of as utilizing a set of rectangular arrays, wherein each row of an array represents a full index broken into segments, with one segment for each column node. Each column in an array can represent a replica (typically to handle query load) for each partition. An appropriate width (e.g., number of partitions) for an index can then largely be determined by considering factors such as a target latency for each request, as well as a storage capacity for each single node storage. As illustrated in FIG. 3(b), a basic approach to reducing latency is to add partitions, or increase the width of the index, such that each partition corresponds to a smaller portion of the index and thus should take less time to process for a given query. As discussed above, however, such an approach can be undesirable in many situations, such as where four servers or partitions are sufficient to process the majority of received queries, as the excess capacity can result in unnecessary expense, maintenance, etc. Further, as discussed, when adding partitions to a system, it typically is necessary to take the system down, or otherwise make the index unavailable, in order to add the new partition(s). In conventional systems it is not possible to dynamically change the number of partitions when a potentially expensive task is received. Thus, the larger width or number of partitions would need to be used for all tasks, after taking the system offline, which can be undesirable in many situations.

FIG. 3(c) shows another example configuration 320 that can be used in accordance with a different embodiment. In this example, additional servers can be used to process expensive tasks dynamically, by changing the effective depth of the partitions instead of the width of the index. For example, the configuration 320 is illustrated to still have four partitions, similar to that illustrated in FIG. 3(a). As such, the index does not need to be made unavailable to add devices or partitions, and additional machines or partitions do not need to be running for tasks that do not require them. Instead, additional machines or devices can be added to a common partition in order to process a portion of the work for that partition. For example, the first partition in FIG. 3(a) corresponds to segments 1-10 of the search index. In FIG. 3(c), an additional server has been requested to process a portion of the work for that partition, such that the first server can process segments 1-5, and the second server can process segments 6-10. In this way, each server processes approximately half of the segments of a given partition, which should improve the latency of processing for that partition. Further, as the partitioning of the index is unchanged, there is no need to make machines available for additional partitions that might not be necessary for the majority of tasks. While additional servers or devices still will need to be available to provide the additional capacity, these machines do not need to be dedicated to processing these particular tasks, and can simply leave some amount of processing capacity to assist in these tasks as needed. In a search engine example, about 0.01% of the queries received might qualify as "expensive" queries that require additional processing capacity, so these additional devices can be available to perform other duties about 99.99% of the time. This approach will be referred to herein as "virtual partitioning," as each machine can process a smaller partition of the work for an expensive task, but the actual partitioning of the index remains unchanged. In a search environment with multiple rows, for example, the index can be arranged such that such that the effective width can be doubled, tripled, etc. for particular queries by resolving expensive queries across multiple rows of the search cluster. Such an approach can significantly reduce latency for expensive queries or other such tasks without incurring a large incremental hardware cost or requiring the index to be taken offline for a period of time.

In some embodiments, the number of partitions used, or provided in the index, can vary by the type of request. For example, in an electronic marketplace there might be many more items in an apparel category than in a television category. Further, a query such as "mens" run against an apparel index might be much more expensive than any query that can be run against the television category. As such, an apparel index might have twelve partitions where the television index might have four, etc. In such a system, it can be desirable to have a number of backup servers or devices that at least equals the largest number of partitions in any index, such that virtual partitioning can be used for any index when needed. An advantage is that these servers can serve as backups for all the indexes in some embodiments, as the small number of expensive queries in any category can allow the servers to serve as backups for any index. In other embodiments, each server runs at a maximum specified capacity for standard tasks, and can provide some of the available capacity for expensive queries in other categories. In this way, no dedicated backup servers may be necessary for virtual partitioning, as servers in one category can serve as backup servers for other categories. Backup machines may exist for reasons such as device failure or maintenance, for example, but need not be dedicated for partitioning purposes alone.

In order to take advantage of the virtual partitioning capability without wasting resources, it can be desirable to relatively accurately determine or predict which queries or other tasks will be "expensive," or require the additional partitioning in order to ensure desired latency or performance. One approach, as illustrated in FIG. 2, is to utilize a data store that includes data for queries or tasks that are determined to be expensive, or to benefit from virtual partitioning. For example, any time a query is received that requires more than a desired amount of processing time, information for that query can be stored to the data store. If that query is subsequently received, the system can determine that the query is an expensive query, such as by checking the historical information in the data store, and can add a parameter to the query or otherwise generate an instruction to process the query using virtual partitioning. In some cases where the time needed to process the query might change, the system also can track queries that are determined to be expensive and where virtual partitioning is used, such that if the queries are subsequently processed in less than a minimum virtual partitioning time, the query can be removed from the data store or otherwise adjusted so as to no longer be listed as an expensive query.

In some embodiments, each query must be received at least once before that query is determined to be expensive, and then the query can subsequently be processed using virtual partitioning. In other embodiments, systems can attempt to predict expensive queries using various prediction approaches. In some embodiments, a system administrator might configure the system to err on the side of using virtual partitioning more than is needed based upon predictions, in order to ensure desirable latency and performance while requiring minimal additional resources. In one embodiment, a system can utilize synonyms to attempt to predict the cost of various tasks. For example, if a query for "books for women" is determined to be expensive, then a query "books for females" may be predicted to be similarly expensive. Some systems also may look to similar words, terms, and phrases, such that a query "books for men" might also be predicted to be expensive based upon the "books for women" determination. For more focused or specific queries, such as "books for young women," the process might not predict that the query will be expensive because less general queries typically take less processing time. On the other hand, if a query "books for women" is determined to be expensive, and a broader query such as "books" is received, then the system can predict that the broader query also will be expensive. In some cases where a broader query is received, the system might actually allocate additional virtual partitions, or additional depth for the index, in order to attempt to provide sufficient processing capacity for the broader query, where the more narrow query is already expensive. Various other approaches to determining similar queries, or queries of similar scope, can be used in accordance with the various embodiments.

Further, the definition of an "expensive" task or query, for example, can change based upon various factors. For example, at "peak" hours where machines may be running at or near capacity, the threshold for an "expensive" task might be higher, or specialized processing of expensive queries might even be disabled temporarily, such that less additional work will be generated. Further, the definition might change on a weekday versus a weekend, for a holiday period, etc. Also, the threshold might change by user, entity, etc. Some customers, for example, might specify tighter response times, or may pay for lower latency. In other cases, certain types of user might qualify for higher levels of service, and thus can be granted lower thresholds for their tasks. As such, the historical data for a query can store a rating instead of a simple flag or other binary determination, such that the relative expense of a query can be stored for use in dynamic determinations of partitioning approaches to be used.

In some embodiments, an "estimating service" or similar service, component, or application can receive information for a task or query, and can provide an estimated or simulated result for anticipated latency, processing time, resource allotment, etc. For example, a query can be passed to the estimating service that can look to factors such as historical information, similar queries, current load, resource allotment, and other such factors, and can make a dynamic determination as to whether virtual partitioning should be used. Further, the estimating service can provide an estimate of the number or levels of virtual partitioning to be used. For example, if a partition includes thirty segments, the estimating service can return valued that specify to use one partition to handle the thirty segments, two partitions to each handle fifteen of the segments, three partitions to each handle ten of the segments, and so on. In some embodiments, there may be no limit on the number of additional virtual partitions that can be used, other than practical limitations such as the number of available devices.

In some embodiments, a first level of virtual partitioning can be used, such as by using two levels of partitions. If the latency is not acceptable, then at least one additional layer of partitioning can be used for subsequent attempts at processing the query. As discussed, various services can be used to estimate the number of levels needed based on existing information, and the number of levels used can increase or decrease based on these and/or other such factors. In one embodiment, an estimating service looks to historical information for the query, the amount of aggregated processing capacity, the number of queries being processed, and acceptable latency values to estimate the number of layers or levels of virtual processing needed. If two layers are used, then for each partition two queries will be sent instead of one, each query including a parameter specifying the segments (e.g., range of segments) of the partition to be processed for each query.

In some embodiments, the number of levels of virtual partitioning is fixed, such that a task is either processed using normal partitioning or processed using virtual partitioning. In this case, a determination can be made as to whether a task is determined or estimated to be expensive, and if so then virtual partitioning can be triggered and an appropriate number of sub-queries generated and submitted for processing. If no tasks are receive that cause virtual partitioning to be triggered, then there is no additional cost to process these relatively inexpensive tasks.

The results from each virtual partition can be consolidated into a set of results using the same process as is used to consolidate the results from standard partitioning. In some cases, a collator or similar process can be configured to handle the results from virtual partitioning differently, while in others the process will just be provided with the number of responses to expect and can wait for the desired number of responses, and consolidate the results.

Figure 4:
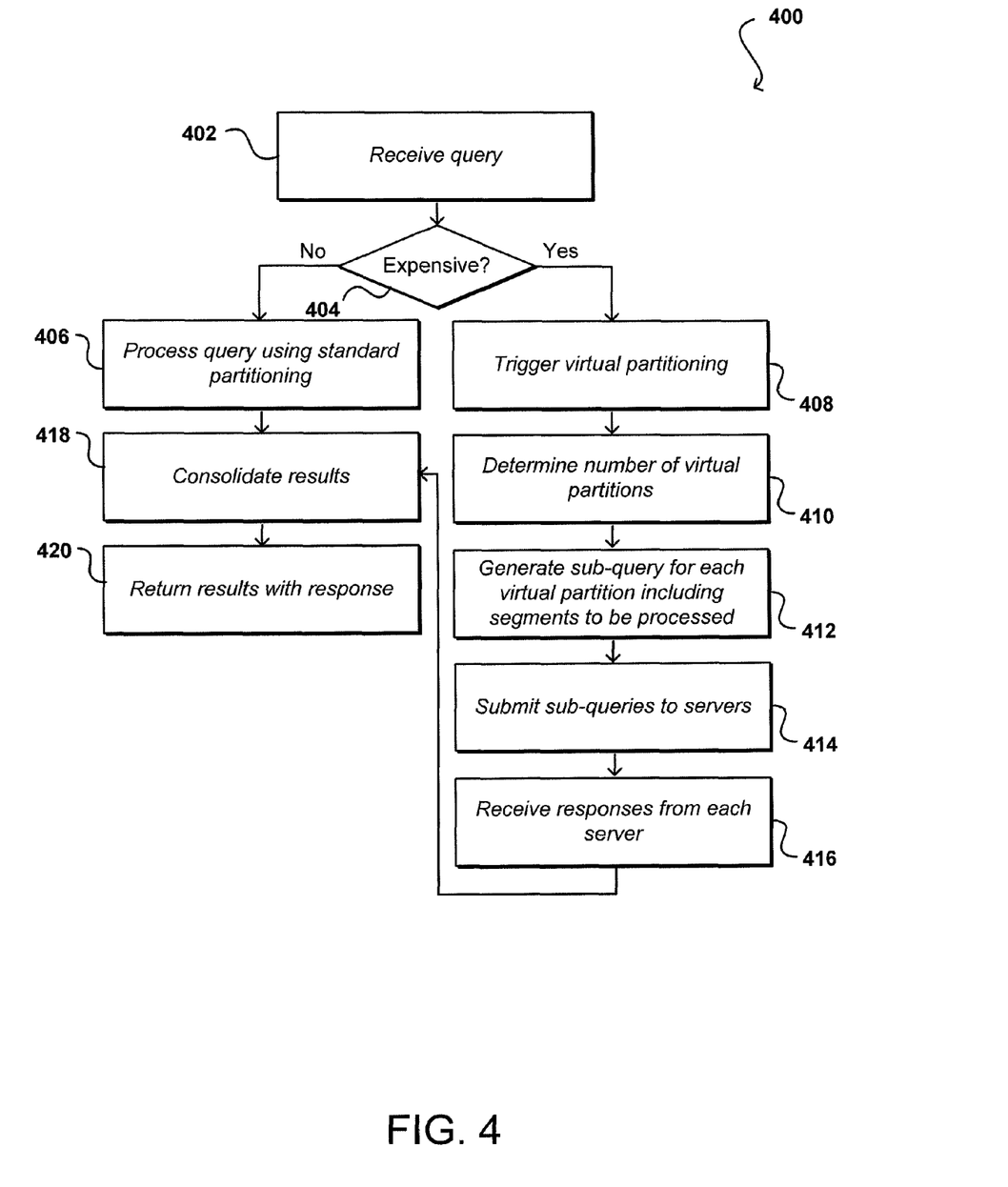
FIG. 4 illustrates an example of a process for reducing latency that can be used in accordance with one embodiment.

FIG. 4 illustrates an example process 400 for processing a task using virtual partitioning that can be used in accordance with one embodiment. This example is described with respect to a search query, but it should be understood that any appropriate task of block of work can be used within the scope of the various embodiments. Further, it should be understood that at least some of the steps presented may be performed in different orders, or in parallel, and that additional, fewer, and/or alternative steps can be used in accordance with various embodiments.

In this example, a search query is received from a user 402 or other such source. The search query can include at least one keyword or term useful in searching for content. A determination is made as to whether the query is an "expensive" query 404, or a query that may not be able to be processed using standard partitioning within an acceptable latency period. As discussed, this can involve any appropriate process, such as looking to see whether the query is listed or flagged as an expensive query, looking at similar queries, or estimating an expense of processing the query. If the query is not determined to be an expensive query, the query is processed using standard partitioning 406, the results are consolidated 418, and the results returned as search results in response to the received search query 420. If the query is determined to be an expensive query, virtual partitioning is triggered 408. A number of virtual partitions to be used is determined 410, and a number of sub-queries is determined that each has a parameter specifying the segments of the partition to be processed 412. The sub-queries are submitted to the appropriate servers 414, and the responses received 416. The results from each query are then consolidated 418, and the results returned as search results in response to the received search query 420.

In addition to tasks and queries that are inherently expensive, however, there also can be other reasons for unacceptable latency that can lead to time-outs, poor user experience, or other such issues. In a federated environment, for example, the overall latency is determined at least in part by the maximum latency of each federated component. Occasionally, due to random factors, at least one of the federated components will take much longer than expected to return. For example, if sub-queries are sent to twelve different servers then it is possible that only eleven of them may response within a specified latency period, such that the entire query can fail as a full set of results is not obtained. In other cases, one of the servers receiving a sub-query may be overloaded or running at maximum capacity, and thus might take longer than desired to respond. In still other cases, there might be communication issues, hardware or software failures, or any of a number of other issues that can cause a response to not be returned in a timely manner. Thus, even if a query is not inherently expensive, or if virtual partitioning is used for an expensive query, there can still be circumstances that cause the latency of the query processing to be unacceptable. The detection of such an issue can enable that portion of the query or task to be retried, either to the same device or to a different device. Such an approach can further help to reduce overall latency, addressing queries or tasks that may not have otherwise been inherently expensive.

Systems and methods in accordance with various embodiments attempt to address such circumstances by providing for what will be referred to here as "adaptive retries". An adaptive retry refers generally to the resending of a request (or a task, message, instruction, or other such construct, etc.) to a different device, service, or other such address or location when a response is not received for a request sent to a first address within a specified amount of time. For example, if sub-queries are sent to twelve servers and eleven of the servers respond, but the twelfth fails to respond within a specified amount of time, another request to process the twelfth sub-query can be resent to another server (e.g., a redundant server), etc. In some embodiments, a retry can be sent to the same server or device, such as where there may have been a communications glitch or other error that might not occur for a separate communication, or where an application glitch or error prevented a set of results from being generated for the first request.

In one embodiment, a search server or monitoring component can monitor the responses from each server or device processing a portion of a task, such as a sub-query for a portion of segments of an index as discussed elsewhere herein. In FIG. 2, this could correspond to the search server 208 that receives the search request and sends sub-requests to each of the partition servers 212. In one example, a response period is specified during which each of the partition servers (or other such devices) is supposed to respond. If any of the partition servers do not respond within this period, then the task sent to that server is resent to that server or a different server. In another embodiment, the system waits for a specified percentage, number, or amount of servers to respond. For example, if sub-requests are sent to twelve partition servers, the system can be configured to wait for ten of the servers to respond. After at least the specified number of servers respond, the system can wait a specified or threshold amount of time for the remaining server(s) to respond. If any server does not respond within a specified amount of time, then the sub-request can be re-sent. Waiting for a specified number of servers to respond before triggering the response threshold can allow the system to, at any specific time, inherently handle operating conditions, such as traffic and current capacity, which can affect the overall latency. In some cases, the latency threshold can be set to a fixed value. For example, after a specified number of servers have responded, a delay timer can be triggered and the remaining servers might have to respond within a time such as 300 milliseconds. In other cases, the threshold can be configurable by an administrator or other such user, or can vary based upon factors such as time of day or system capacity. For example, the system can dynamically adjust the threshold as a percentage of a current average latency time or other such factor.

In some cases where an adaptive retry is sent, the original server will return a response before the redundant or secondary server. Such an occurrence can be handled in any of a number of ways. A first approach is to simply utilize the first response that is received, and discard the other response if the response is ever received. Another approach, particularly useful for very processing-intensive queries, would be to send a request to stop processing for one of the requests when a response is received for the other request, be it from the original server or the redundant server. Another approach would compare the two results if received within a certain period of time to ensure that the responses match, and if not resend to another server, etc.

Each time an adaptive retry is sent, information can be logged that can be used to analyze performance. For example, if a particular server has an undesirably high number of associated retries, then a message or other indication can be generated that enables an administrator or other user to determine whether to replace or repair that server. In other cases, a load balancing component can utilize this information to distribute work to other servers with faster response times. In some cases where the latency for a server meets or exceeds a maximum latency threshold, that server might not receive any subsequent requests until the server is back under the threshold, or might not receive any more requests until someone investigates the cause of the delay, etc.

In some cases, a response to an adaptive retry might not be received within the specified amount of time. In various embodiments, another retry can be sent to attempt to obtain a response. In some embodiments, the request can be re-tried until a maximum latency threshold is reached, the request times out, or another such occurrence. In other embodiments, a maximum number of retries is specified, such as once per partition. In some embodiments the maximum number of retries and period for reply can vary, while in others these values can remain fixed, such as where machines are added or removed from the system in order to maintain a relatively consistent load on each machine.

Figure 5:
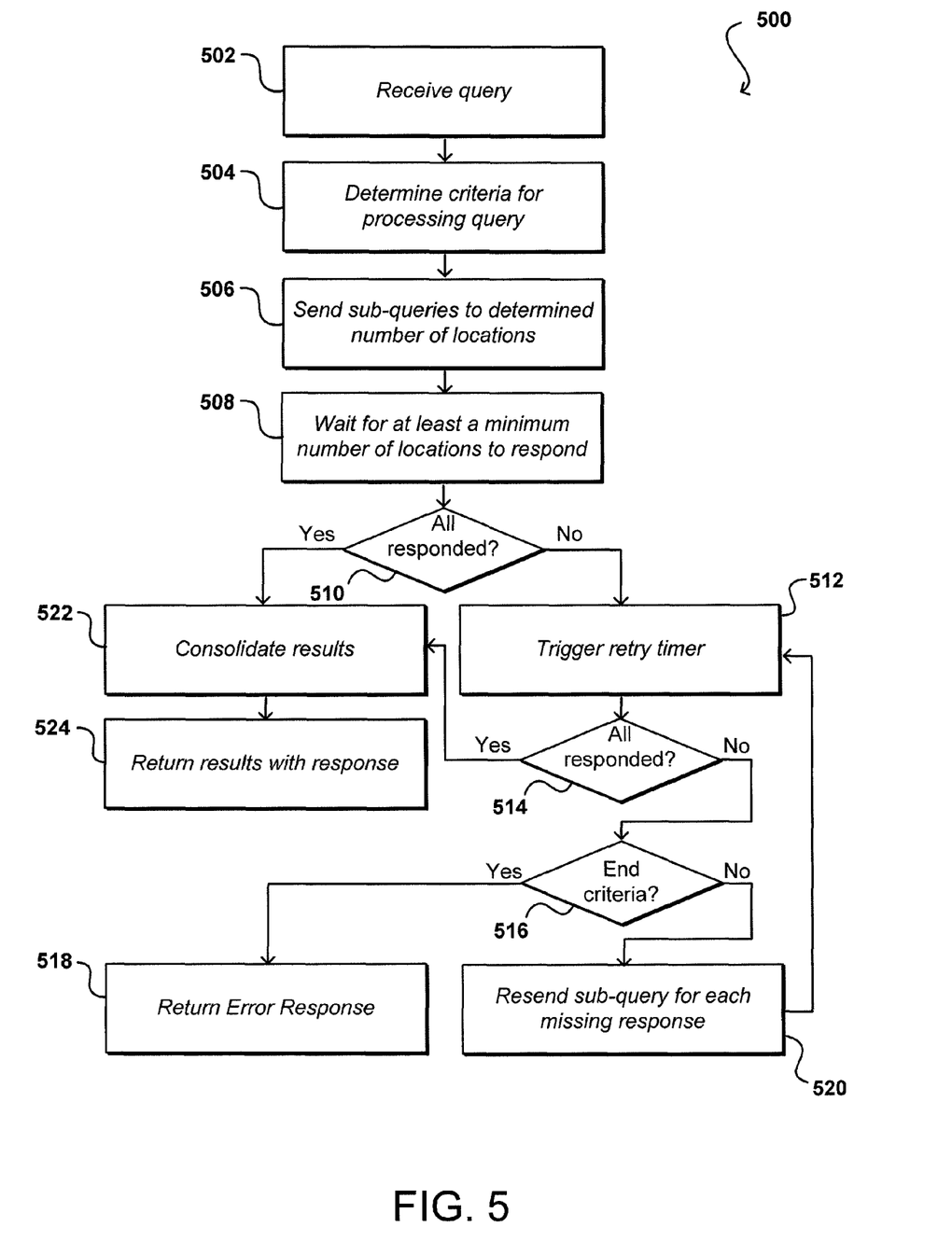
FIG. 5 illustrates an example of a process for adaptively retrying portions of a task that can be used in accordance with one embodiment.

FIG. 5 illustrates an example of a process 500 for triggering an adaptive retry that can be used in accordance with one embodiment. As with the process of FIG. 4, many variations are possible within the scope of the various embodiments. A task of work is to be processed, in this case corresponding to a query received from a user or other such source 502, although other tasks can be processed as well within the scope of the various embodiments. Upon receiving the query, any appropriate criteria for processing the query can be determined 504. In some embodiments each query or task will be processed using the same criteria, such as a number of partitions to use to process the query and an amount of time to wait for a response. In other embodiments, at least some of these criteria can vary by type or category or request, or any other appropriate criteria, as discussed elsewhere herein. An appropriate number of sub-queries can be generated and sent to a determined number of locations 506. As discussed above, this can comprise a set of queries being generated that each include at least one parameter specifying a range of segments of an index to be processed by a respective partition server. Once the sub-queries are sent, the system can wait for a minimum number, percentage, or other such threshold of responses to the sub-queries to return 508. In some cases a set amount of time can be used, but in this embodiment a minimum number of responses is used in order to account for the different times needed to process different queries. Once at least the minimum number of responses has been received, a determination is made as to whether all the appropriate responses to the sub-queries have been received 510. If not, a "retry" or similar timer can be triggered 512. The timer can be set to any determined amount of time, such as may be specified by at least one criterion for the query. If all the responses are received before the timer "expires" or otherwise notifies the system that the specified period of time has elapsed 514, then the results can be consolidated 522 and the appropriate results returned with a response to the initial query 524. If the timer expires and not all responses have been received, a determination can be made as to whether an end criteria has been met 516. For example, a system might include a maximum number of retries for any given query, such as once per sub-query. Various other end criteria can exist, such as an overall time-out period after which no further processing may be done for a query regardless of the point in the process. If an end criteria is met, an error response can be returned 518, such as a timeout error message or an "unable to process" or similar message. If an end criteria has not been met, each sub-query for which a response has not been received can be re-sent 520. As discussed above, the sub-query can be sent to the same location or a different location, such as a backup server or other such device. A retry timer can again be triggered and the process can continue until either all the responses are received, and thus can be consolidated and returned in response to the query, or until an end criteria or other such situation is met. As discussed above, if more than one response is received for a sub-query as a result of a retry, the first response can be used and the other(s) discarded in some embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for reducing processing latency for search queries, comprising:
under control of one or more computer systems configured with executable instructions,
receiving a search query to be executed against an index including a plurality of segments partitioned into a set of partitions, each partition corresponding to a range of segments of the plurality of segments;
prior to executing the search query, determining a likelihood that the search query is able to be executed against the index according to the set of partitions within a specified amount of time using a respective processing device for each partition; and
when the query is determined to be unlikely to be processed according to the set of partitions within the specified amount of time using the respective processing device:
splitting the range of segments for each partition into at least a first portion and a second portion;
assigning at least one additional processing device to process the second portion of the range of segments for each partition in response to a determination that the query is unlikely to be processed within the specified amount of time; and
executing the search query against the index using, for each partition, the respective processing device for the first portion and the at least one additional processing device for the second portion;
receiving responses from at least a minimum number of processing devices assigned to process the partitions; and
starting a delay timer once the responses have been received from the minimum number of processing devices, wherein if results have not been received from all processing devices after a period of delay as determined by the delay timer, each partition for which results have not been received is assigned to a different processing device.

2. The computer-implemented method of claim 1, further comprising:
consolidating results from each processing device; and
providing a response for the search query based at least in part on the consolidated results.

3. The computer-implemented method of claim 1, wherein:
determining a likelihood that the search query is able to be executed against the index according to a set of partitions within a specified amount of time comprises searching a query data store for past performance information relating to the search query.

4. A computer-implemented method for reducing processing latency for selected tasks, comprising:
under control of one or more computer systems configured with executable instructions,
receiving a task to be processed across a resource including a plurality of partitions, each partition corresponding a respective portion of the resource;
prior to processing the task, determining a likelihood that the task is able to be processed according to the plurality of partitions within a specified amount of time using a respective processing device for each partition; and
when the task is determined to be unlikely to be processed according to the plurality of partitions within the specified amount of time using the respective processing device:
dividing at least one partition into at least two sub-portions;
assigning at least one additional processing device to process at least one of the at least two sub-portions in response to a determination that the task is unlikely to be processed within the specified amount of time;
processing the task using (i) for the at least one partition, a respective processing device for one of the at least two sub-portions and the at least one additional processing device for a remainder of the at least two sub-portions, and (ii) a respective processing device for each of the remaining partitions of the plurality of partitions;
receiving responses from at least a minimum number of processing devices assigned to process the partitions; and
starting a delay timer once the responses have been received from the minimum number of processing devices, wherein if results have not been received from all processing devices after a period of delay as determined by the delay timer, each partition for which results have not been received is assigned to a different processing device.

5. The computer-implemented method of claim 4, wherein:
the resource is a search index including a plurality of segments and the task corresponds to a search query to be executed against the search index, and
wherein each partition corresponds to a range of segments of the plurality of segments.

6. The computer-implemented method of claim 4, wherein:
determining a likelihood that the task is able to be processed according to the plurality of partitions within a specified amount of time includes looking to historical processing information relating to the received task.

7. The computer-implemented method of claim 4, further comprising:
determining a number of sub-portions into which the at least one partition is to be divided.

8. The computer-implemented method of claim 4, further comprising:
consolidating results from each partition; and
providing the consolidated results in response to processing the task.

9. The computer-implemented method of claim 4, further comprising:
when the task is determined to be likely to be processed according to the plurality of partitions within the specified amount of time, processing the task according to the plurality of partitions using a respective processing device for each partition.

10. The computer-implemented method of claim 4, wherein:
determining a likelihood that the task is able to be processed according to the plurality of partitions within a specified amount of time includes looking to processing information stored for at least one related task.

11. The computer-implemented method of claim 4, further comprising:
when results are received corresponding to the assigning of the partition for which results have not been received to the different processing device, consolidating the received results and discarding any subsequent results received that correspond to the resending.

12. The computer-implemented method of claim 4, further comprising:
triggering the delay timer when the partition for which the results have not been received is assigned to the different processing device; and
if results corresponding to the partition assigned to the different processing device are not received after a period of delay as determined by the delay timer, re-assigning the partition for which results have not been received to be processed by a second different processing device.

13. A system for reducing processing latency for selected tasks, comprising:
a processor; and
a memory device including instructions that, when executed by the processor, cause the processor to:
determine a task to be processed across a resource including a plurality of partitions, each partition corresponding to a portion of the resource;
determine a likelihood that the task is able to be processed according to the plurality of partitions within a specified amount of time using a respective processing device for each partition; and
when the task is determined to be unlikely to be processed according to the plurality of partitions within the specified amount of time:
divide at least one partition into at least two sub-portions;
assign at least one additional processing device to process at least one of the at least two sub-portions in response to a determination that the task is unlikely to be processed within the specified amount of time; and
process the task using (i) for the at least one partition, a respective processing device for one of the at least two sub-portions and the at least one additional processing device for the remainder of the at least two sub-portions, and (ii) a respective processing device for each of the remaining partitions of the plurality of partitions,
receive responses from at least a minimum number of processing devices assigned to process the partitions; and
start a delay timer once the responses have been received from the minimum number of processing devices, wherein if results have not been received from all processing devices after a period of delay as determined by the delay timer, each partition for which results have not been received is assigned to a different processing device.

14. The system of claim 13, wherein:
the task corresponds to a search query to be executed against a search index including a plurality of segments, and
wherein each partition corresponds to a range of segments of the plurality of segments.

15. The system of claim 13, wherein the memory device further includes instructions that, when executed by the processor, cause the processor to:
consolidate results from each partition; and
provide the consolidated results in response to processing the task.

16. A computer program product embedded in a non-transitory computer-readable medium for reducing processing latency in an electronic environment, the computer program product including instructions that, when executed by at least one computing device, cause the at least one computing device to:
determine a task to be processed across a resource including a plurality of partitions, each partition corresponding to a portion of the resource;
determine a likelihood that the task is able to be processed according to the plurality of partitions within a specified amount of time using a respective processing device for each partition; and
when the task is determined to be unlikely to be processed according to the plurality of partitions within the specified amount of time:
divide at least one partition into at least two sub-portions;
assigning at least one additional processing device to process at least one of the at least two sub-portions in response to a determination that the task is unlikely to be processed within the specified amount of time; and
process the task using (i) for the at least one partition, a respective processing device for one of the at least two sub-portions and the at least one additional processing device for the remainder of the at least two sub-portions, and (ii) a respective processing device for each of the remaining partitions of the plurality of partitions,
receive responses from at least a minimum number of processing devices assigned to process the partitions; and
start a delay timer once the responses have been received from the minimum number of processing devices, wherein if results have not been received from all processing devices after a period of delay as determined by the delay timer, each partition for which results have not been received is assigned to a different processing device.

17. The computer program product of claim 16, wherein:
the task corresponds to a search query to be executed against a search index including a plurality of segments, and
wherein each partition corresponds to a range of segments of the plurality of segments.

18. The computer program product of claim 16, further including instructions that, when executed by at least one computing device, cause the at least one computing device to:
consolidate results from each partition; and
provide the consolidated results in response to processing the task.

19. The computer program product of claim 16, wherein:
determining a likelihood that the task is able to be processed according to the set of partitions within a specified amount of time includes looking to processing information stored for at least one related task.

* * * * *